United States Patent
Cui et al.

(10) Patent No.: US 9,571,710 B2
(45) Date of Patent: Feb. 14, 2017

(54) MICROLENS ARRAY IMAGING DEVICE AND IMAGING METHOD

(71) Applicants: SUPERD CO. LTD., Shenzhen (CN); SHENZHEN MERCURY OPTOELECTRONICS RESEARCH INSTITUTE, Shenzhen (CN)

(72) Inventors: Chunhui Cui, Shenzhen (CN); Huafu Mai, Shenzhen (CN); Mao Ye, Shenzhen (CN)

(73) Assignees: SUPERD CO. LTD., Shenzhen (CN); SHENZHEN MERCURY OPTOELECTRONICS RESEARCH INSTITUTE, Shenzhen (CN)

( * ) Notice: Subject to any disclaimer, the term of this patent is extended or adjusted under 35 U.S.C. 154(b) by 0 days.

(21) Appl. No.: 14/886,213

(22) Filed: Oct. 19, 2015

(65) Prior Publication Data
US 2016/0191766 A1   Jun. 30, 2016

(30) Foreign Application Priority Data
Dec. 30, 2014 (CN) .......................... 2014 1 0840691

(51) Int. Cl.
H04N 5/225    (2006.01)
H04N 5/217    (2011.01)
G02B 27/00    (2006.01)

(52) U.S. Cl.
CPC ........ H04N 5/2254 (2013.01); G02B 27/0075 (2013.01); H04N 5/2173 (2013.01)

(58) Field of Classification Search
CPC .... H04N 5/2254; H04N 5/2173; H04N 5/225; G02B 27/0075
USPC ......................................... 348/335, 340, 345
See application file for complete search history.

(56) References Cited

U.S. PATENT DOCUMENTS

| | | | |
|---|---|---|---|
| 8,941,771 B2 * | 1/2015 | Iwane | G06T 1/0007 250/208.1 |
| 2015/0029386 A1 * | 1/2015 | Pitts | H04N 5/2254 348/345 |
| 2015/0319351 A1 * | 11/2015 | Iwane | H04N 5/232 348/335 |

* cited by examiner

*Primary Examiner* — Sinh Tran
*Assistant Examiner* — Zhenzhen Wu
(74) *Attorney, Agent, or Firm* — Anova Law Group, PLLC (57) ABSTRACT

A microlens array imaging device includes a main lens, a microlens array containing a plurality of microlenses, and an image acquisition unit. The main lens projects a first image of an object for the plurality of microlenses, each of which projects a second image of the first image on the image acquisition unit. Each second image includes an image circle and a circle of confusion around the image circle. A distance between an image circle of one microlens and an image circle of an adjacent microlens is equal to or greater than a summation of a radius of the second image corresponding to the one microlens and a radius of the image circle of the adjacent microlens, and is equal to or less than a summation of the radius of the second image corresponding to the one microlens and a radius of the second image corresponding to the adjacent microlens.

15 Claims, 8 Drawing Sheets

MICROLENS ARRAY IMAGING DEVICE AND IMAGING METHOD

CROSS-REFERENCES TO RELATED APPLICATIONS

This application claims the priority of Chinese patent application No. CN201410840691.6, filed on Dec. 30, 2014, the entire content of which is incorporated herein by reference.

FIELD OF THE DISCLOSURE

The present disclosure generally relates to the field of imaging technologies and, more particularly, relates to a microlens array imaging device and an imaging method.

BACKGROUND

Microlens arrays are widely used in light filed cameras, compound eye cameras, and wide angle microscope cameras. In general, the images projected by a microlens array require post processing, such as matching and combining of each and every image projected by each microlens in the microlens array. However, due to the wave nature of light, the image projected by each microlens of the microlens array may have a vignetting effect with a gradual decrease in light intensity from image center toward the image periphery, causing severe distortions in the post processed images.

Currently, consumer electronic devices and industrial testing equipment are becoming lightweight, thin, and portable. Generally, multiple lens groups are often used to achieve flexible imaging functions. This may limit the light-and-thin configuration and portability of such devices and equipment.

The disclosed microlens array imaging device and imaging method are directed to solve one or more problems set forth above and other problems in the art.

BRIEF SUMMARY OF THE DISCLOSURE

Directed to solve one or more problems set forth above and other problems in the art, the present disclosure provides a microlens array imaging device and imaging method to improve image quality and to reduce the thickness of imaging device.

One aspect of the present disclosure provides a microlens array imaging device. The device includes a main lens, a microlens array containing a plurality of microlenses arranged in an array, and an image acquisition unit configured to acquire images projected by the microlens. The main lens projects a first image of an object for the plurality of microlenses, each of which projects a second image of the first image on the image acquisition unit. Each second image includes an image circle and a circle of confusion around the image circle. A distance between an image circle of one microlens and an image circle of an adjacent microlens is equal to or greater than a summation of a radius of the second image corresponding to the one microlens and a radius of the image circle of the adjacent microlens, and is equal to or less than a summation of the radius of the second image corresponding to the one microlens and a radius of the second image corresponding to the adjacent microlens.

Optionally, the image acquisition unit is disposed a side of the microlens array away from the main lens. The first image of the object is projected on a side of the image acquisition unit away from the microlens array.

Optionally, a circle of confusion of the one microlens is tangent to a circle of confusion of the adjacent microlens.

Optionally, the microlens array imaging device has an actual aperture stop same as an aperture stop of the main lens.

Optionally, the image circle of each second image is an image of principal rays that are projected on the image acquisition unit.

Optionally, the plurality of the microlenses has same dimensions and shapes.

Optionally, the image circle of the one microlens is tangent to the circle of confusion of the adjacent microlens.

Optionally, the microlens array imaging device further includes an image processing unit configured to combine together the second images of the plurality of microlenses to generate a desired image of the object.

Optionally, the ratio of overlapping of the second image of the one microlens to the second image of the adjacent microlens is proportional to a diameter of the image circle of the second image of each of the one microlens and the adjacent microlens.

Optionally, the image circle of the second image of the one microlens is tangent to an image circle of the second image of diagonal microlens.

Another aspect of the present disclosure provides an imaging method for a microlens array imaging device containing a main lens, a microlens array containing a plurality of microlenses arranged in an array, and an image acquisition unit configured to acquire images projected by microlens. The method includes projecting a first image of an object through the main lens for the plurality of microlenses and projecting a plurality of second images of the first image on the image acquisition unit through each microlens. Each second image includes an image circle and a circle of confusion around the image circle. A distance between an image circle of one microlens and an image circle of an adjacent microlens is equal to or greater than a summation of a radius of the second image corresponding to the one microlens and a radius of the image circle of the adjacent microlens, and is equal to or less than a summation of the radius of the second image corresponding to the one microlens and a radius of the second image corresponding to the adjacent microlens.

Optionally, the first image is a virtual object for the microlens array.

Optionally, a circle of confusion of the one microlens is tangent to a circle of confusion of the adjacent microlens.

Optionally, the imaging method further includes combining together the second images projected by the plurality of the microlenses to generate a desired image of the object.

Optionally, the image circle of the second image of the one microlens is tangent to an image circle of the second image of a diagonal microlens.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 1:
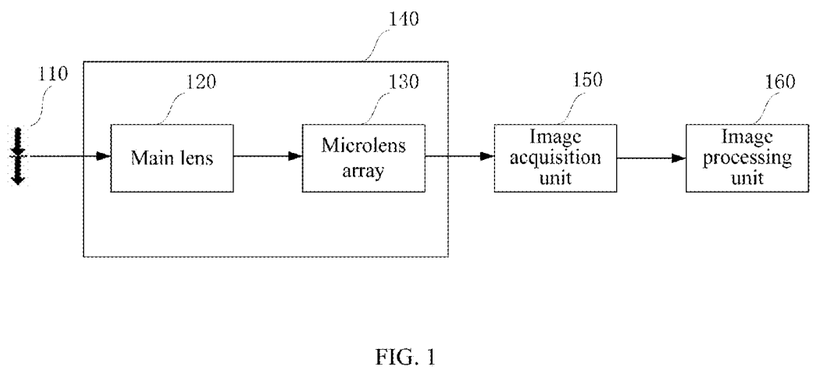
FIG. 1 illustrates a block diagram of an exemplary microlens array imaging device according to the disclosed embodiments.

FIG. 1 illustrates a block diagram of an exemplary microlens array imaging device according to the present disclosure. The microlens array imaging device may include an optical lens group 140, an image acquisition unit 150, and an image processing unit 160.

The optical lens group 140 of the microlens array imaging device may include a main lens 120, a microlens array 130. The image acquisition unit 150 may be configured on the side of the microlens array 130 away from the main lens 120. A microlens is a small lens, generally with a diameter less than an ordinary lens, such as less than one millimeter (mm) and often as small as 10 micrometers (µm). A microlens may be a single element having certain optical configuration. For example, a microlens may have one plane surface and one spherical convex or concave surface to refract the light, may have two spherical convex or concave surfaces, or may have two flat or plane surfaces. The microlens array may have a plurality of microlens arranged in an array on, for example, a substrate (not shown) to form a larger lens structure.

The main lens 120 may include any appropriate lens, such as an optical lens, liquid crystal lens, or other lens for imaging purposes. The image acquisition unit 150 may include any appropriate image capturing devices, such as an image sensor including semiconductor charge-coupled devices (CCD) or active pixel sensors in complementary metal-oxide-semiconductor (CMOS) or N-type metal-oxide-semiconductor (NMOS) devices.

The image processing unit 160 may include any appropriate processing circuitry and logics for performing image processing. For example, the image processing unit 160 may include a graphic processor or a general purpose processor, with supporting memory modules and other components for processing the image information from the image acquisition unit 150.

In operation, an object 110 may appear in front of the optical lens group 140 (i.e., the main lens 120 and the microlens array 130), and the optical lens group 140 may project light from the object 110 through the main lens 120 and the microlens array 130 and onto the image acquisition unit 150 away from the microlens array 130. The images captured by the image acquisition unit 150 may then be processed by the image processing unit 160 to generate an image of the object 110.

Figure 2:
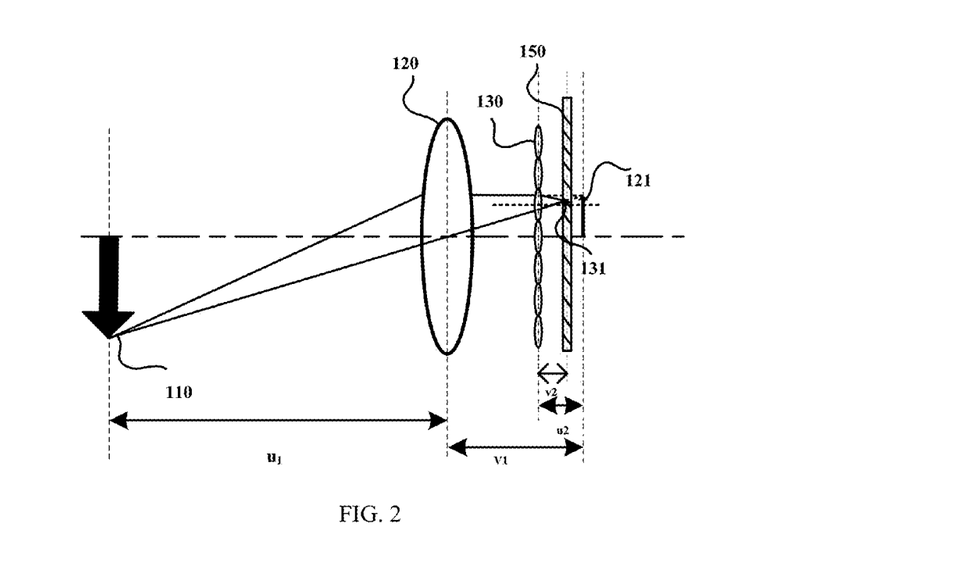
FIG. 2 illustrates a schematic view of optical path for an exemplary microlens array imaging device according to the disclosed embodiments.

FIG. 2 illustrates an optical path diagram of the exemplary microlens array imaging device. As shown in FIG. 2, the microlens array 130 may include a plurality of microlenses 131 arranged in an array. In one embodiment, the plurality of the microlenses may have same dimensions and shapes. Alternatively, in other embodiments, the plurality of the microlenses may have different dimensions and different shapes, depending on the actual needs.

Figure 3:
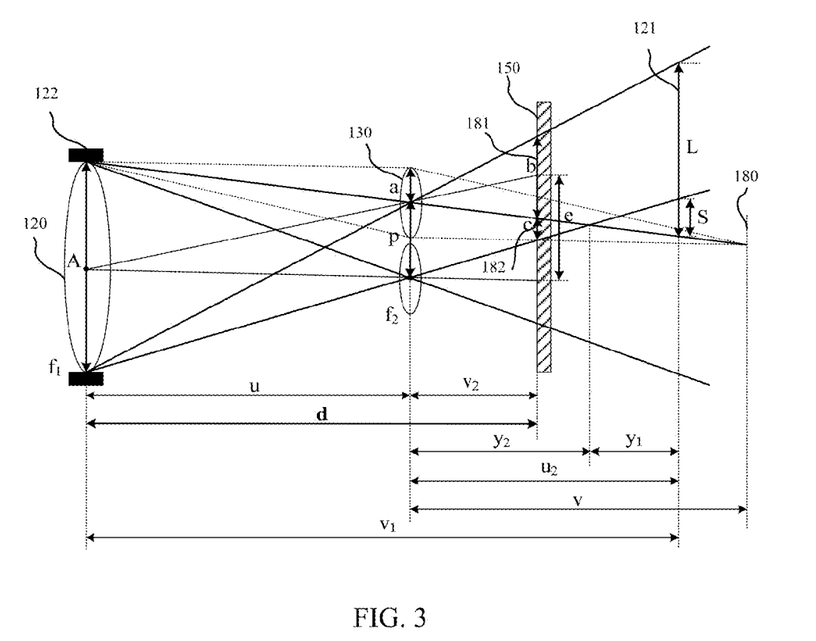
FIG. 3 illustrates an image circle model diagram of the exemplary microlens array shown in FIG. 2.

When light from object 110 passes the optical lens group 120, the main lens of the microlens array imaging device may project a first image 121 of an object 110 on the side of the image acquisition unit 150 away from the microlens array 130. FIG. 3 illustrates a more detailed optical path diagram.

When images are formed or projected by the main lens 120 and the microlens array 130, the main lens 120 generates a first image of the object 110, and the first image is an object for a microlens of the microlens array 130 to generate a second image. As shown in FIG. 3, the first image S and the first image L are located on the side of the image acquisition unit 150 away from the microlens array 130 and are virtual objects for two microlenses of the microlens array 130.

The first image 121 may be a virtual object for the microlens array 130 because the first image 121 is located on the side of the image acquisition unit 150 away from the microlens array 130. According to Gaussian imaging principle, when a positive lens is used for real object imaging at any object distance, the image distance must be equal to or greater than the focal length of the lens. When a positive lens is used for virtual object imaging at any object distance, the image distance must be equal to or less than the focal length of the lens. Thus, the application of virtual object imaging method to the microlens array 130 may be used to reduce the thickness of the microlens array imaging device.

Figure 4:
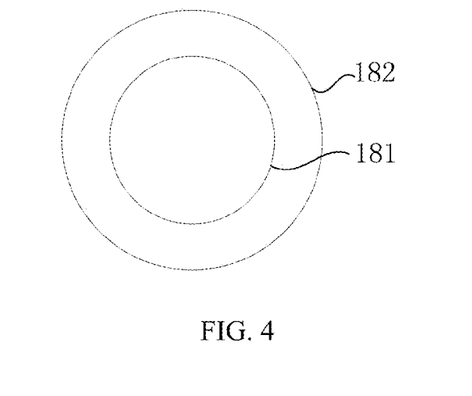
FIG. 4 illustrates a schematic view of a second image projected by a microlens on an image acquisition unit shown in FIG. 2.

Each microlens may project a second image of the first image 121 on the image acquisition unit 150. In one embodiment, the microlens array imaging device may have an actual aperture stop same as the aperture stop 122 of the main lens 120. As shown in FIG. 4, each second image may include an image circle 181 and a circle of confusion 182 around the image circle 181. The image circle 181 may represent an image of principal rays (or chief rays, b rays)

passing through the aperture stop on the image acquisition unit 150 and may define the effective field of view of each microlens 131. The circle of confusion 182 may be the ring around the image circle and may be symmetrically distributed with respect to the principal axis of the main lens. Generally, due to the image distortion and the sharp decline in brightness inside the ring c (shown in FIG. 3) in the circle of confusion 182, the imaging quality may decrease.

The first image 121 projected by the main lens 120 may be projected again by each microlens 130 respectively on the image acquisition unit 150. After transformed twice by the main lens 120 and the microlens, the final image may be upright. Thus, minimum image processing may be required further to restore the image of the original object. The main lens 120 and the aperture stop 122 are coupled with each microlens 131 in the microlens array 130 and each may have the optical paths governed by the Gaussian imaging principle. When the imaging device is placed in plain air, the object-image relationship may be represented by the equations (1) to (3) shown below.

$$\frac{1}{u_1} + \frac{1}{v_1} = \frac{1}{f_1} \quad (1)$$

$$\frac{1}{-u_2} + \frac{1}{v_2} = \frac{1}{f_2} \quad (2)$$

$$\frac{1}{u} + \frac{1}{v} = \frac{1}{f_2} \quad (3)$$

In the above equations, $u_1$ is the object distance of the main imaging lens 120; $v_1$ is the image distance of the main imaging lens 120; $f_1$ is the focal length of the main imaging lens 120; $u_2$ is the object distance of the imaging microlens array 130; $v_2$ is the image distance of the imaging microlens array 130, i.e., the distance between the image acquisition unit 150 and the microlens array 130; $f_2$ is the focal length of the imaging microlens array 130; u is the distance between the aperture stop 122 of the main lens 120 and the microlens array 130; and v is the image distance of the imaging microlens array 130 with respect to the aperture stop 122 of the main lens 120.

Assuming that each microlens 131 of the microlens array 130 has an effective half-aperture a, the distance between adjacent microlenses 131 is p, the diameter b of the principal ray image circle 181 of the microlens 131 may be represented as:

$$\frac{b}{A} = \frac{v_2}{u} \Rightarrow b = \frac{v_2}{u}A = \frac{d-u}{u}A \quad (4)$$

where A is the value of the aperture stop 122 of the main lens 120.

The distance e between the centers of adjacent principal ray image circles 181 may be represented as:

$$\frac{p}{e} = \frac{u}{d} \Rightarrow e = \frac{d}{u}p \quad (5)$$

Because the individual images of microlenses are required to be combined together to restore the complete image in post image processing, the images of adjacent microlenses 131 that are projected on the image acquisition unit 150 as the second images must not interfere with one another when captured. In one embodiment, the distance D between the centers of the image circles 181 of adjacent microlenses 131 may be equal to or greater than the summation of the radius $R_1$ of the second image corresponding to one microlens 131 and the radius $r_2$ of the image circle 181 corresponding to the adjacent microlenses 131, but may be equal to or less than the summation of the radius $R_1$ of the second image corresponding to one microlens 131 and the radius $R_2$ of the second image corresponding to the adjacent microlens 131.

Figure 5:
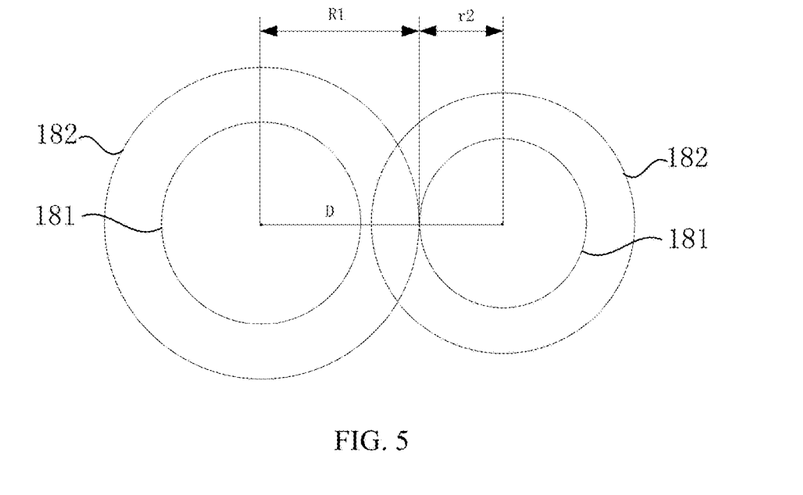
FIG. 5 illustrates a schematic view of a first position relationship between the second images projected by adjacent microlenses shown in FIG. 2.

Referring to FIG. 5, when the adjacent microlenses 131 have different radii of the second images, and the distance D between the centers of the image circles 181 of the adjacent microlenses 131 is equal to the summation of the radius $R_1$ of the second image corresponding to one microlens 131 and the radius $r_2$ of the image circle 181 corresponding to the adjacent microlenses 131, the image circle 181 of one microlens 131 may be tangent to the circle of confusion 182 of the adjacent microlens 131.

Figure 6:
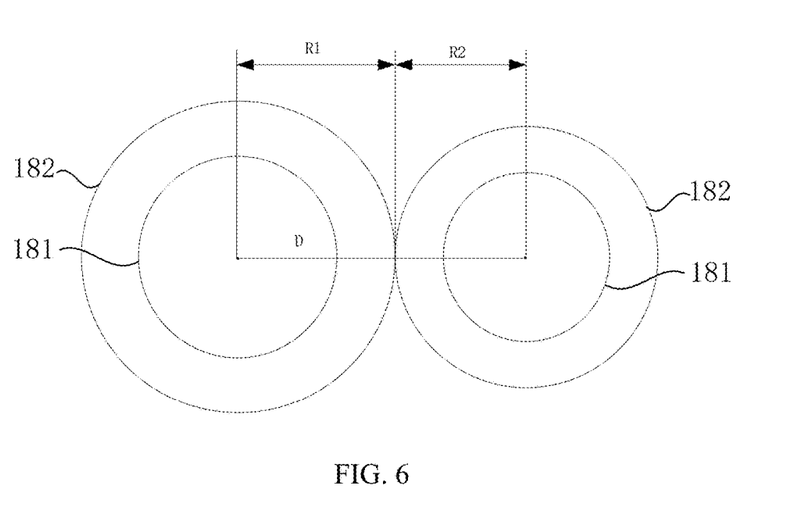
FIG. 6 illustrates a schematic view of a second position relationship between the second images projected by adjacent microlenses shown in FIG. 2.

Referring to FIG. 6, when the distance D between the centers of the image circles 181 of the adjacent microlenses 131 is equal to the summation of the radius $R_1$ of the second image corresponding to one microlens 131 and the radius $r_2$ of the image circle 181 corresponding to the adjacent microlens 131, the circle of confusion 182 of one microlens 131 may be tangent to the circle of confusion 182 of the adjacent microlens 131. In this case, the circles of confusion 182 of the adjacent microlens 131 may not overlap with one another.

Figure 7:
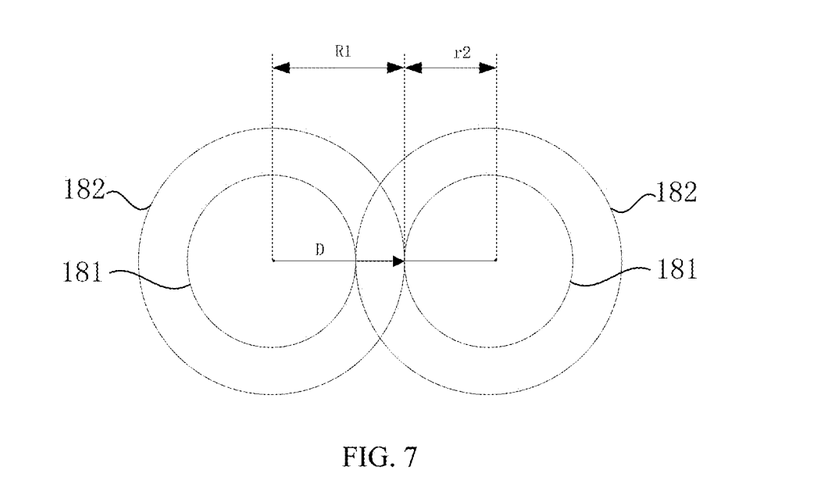
FIG. 7 illustrates a schematic view of a third position relationship between the second images projected by adjacent microlenses shown in FIG. 2.

Referring to FIG. 7, in one embodiment, when a plurality of microlenses 131 has same dimensions and shapes, and the distance D between the centers of the image circles 181 of the adjacent microlenses 131 is equal to the summation of the radius $R_1$ of the second image corresponding to one microlens 131 and the radius $r_2$ of the image circle 181 corresponding to the adjacent microlens 131, the image circle 181 of one microlens 131 may be tangent to the circle of confusion 182 of the adjacent microlens 131. In this case, the circles of confusion 182 of the adjacent microlens 131 may overlap with one another. However, the principal ray image circles 181 of individual microlenses 131 may not interfere or overlap with one another. Thus, the principal ray image circles 181 of individual microlens 131 are to stay clear with one another and to maximize the effective utilization of the pixel units of the image acquisition unit 150.

Specifically, c represents the radius of the circle of confusion of the microlens 131 as shown in the equation (6) below.

$$c = \frac{v_2 - v}{v}a \quad (6)$$

As indicated by the equation (6), the smaller the effective aperture of each microlens 131, the less amount of abaxial rays may be admitted along the optical path of each microlens 131. In other words, the circle of confusion ring c of each microlens 131 may decrease. Thus, the utilization of pixel units of the image acquisition unit 150 may increase.

The microlens array imaging device may also include an image processing unit 160, configured to combine together the second image projected by the plurality of microlenses 131.

Figure 8:
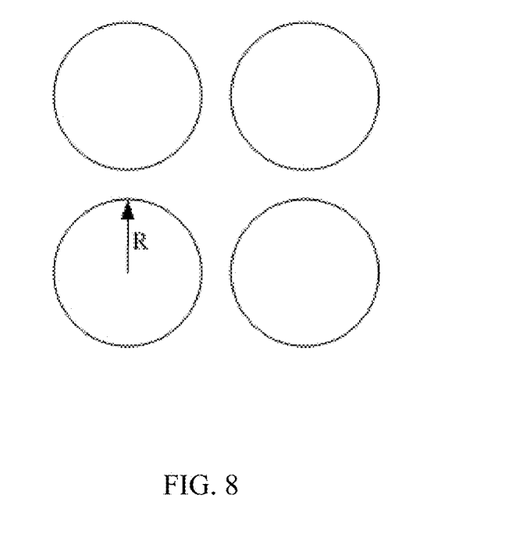
FIG. 8 illustrates a schematic view of the second images projected by each microlens shown in FIG. 2 on the image acquisition unit.
Figure 9:
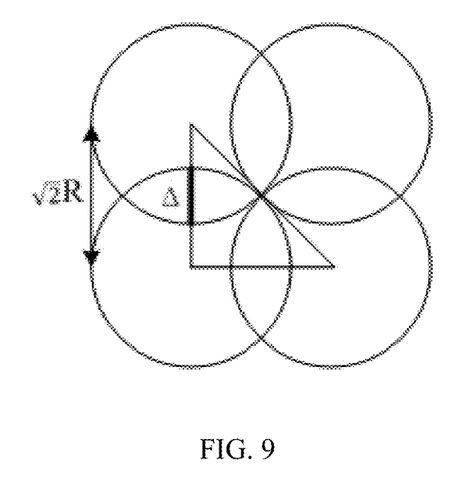
FIG. 9 illustrates a schematic view of the second images projected by each microlens shown in FIG. 2 and combined together by an image processing unit according to the disclosed embodiments.

Referring to FIGS. 8 and 9, when the image processing unit 160 combines together the second images of the plurality of the microlenses 131, the plurality of the second images may be moved close to one another before being combined. Specifically, the image circle 181 of the second image of each microlens 131 may partially overlap with the image circles 181 of the second images of adjacent microlenses 131. The ratio of overlapping of the second images of adjacent microlenses 131 may be proportional to the diameter of the image circle 181 of the second image of each microlens 131.

In one embodiment, to ensure the seamless combining of the image circles 181 of adjacent second images and to maximize the image resolution of the combined image, the image circle 181 of the second image of each microlens 131 may be tangent to the image circle 181 of the second image of the diagonal microlens 131. As illustrated in FIG. 9, the ratio of overlapping of the image circle 181 of the second image of each microlens 131 with the image circle 181 of the second image of the adjacent microlens 131 may be represented in the equation (7) below.

$$\Delta = 2R - \sqrt{2} R = \left(1 - \frac{1}{\sqrt{2}}\right) b \quad (7)$$

At the same time, to make sure that the image circle 181 of the second image of each microlens 131 is tangent to the image circle 181 of the second image of the diagonal microlens 131, the microlens array imaging device may need to satisfy the conditions described in the equations (8) and (9) below.

$$r = \frac{p}{A} \quad (8)$$

$$\frac{u_2}{v_1} \geq \sqrt{2}\, r \quad (9)$$

where p is the gap between adjacent microlenses 131, r is the ratio of the gap between adjacent microlenses 131 to the aperture stop 122 of the main lens 120, $v_1$ is the image distance of the main lens 120, and $u_2$ is the object distance of the microlenses 131.

Figure 10:
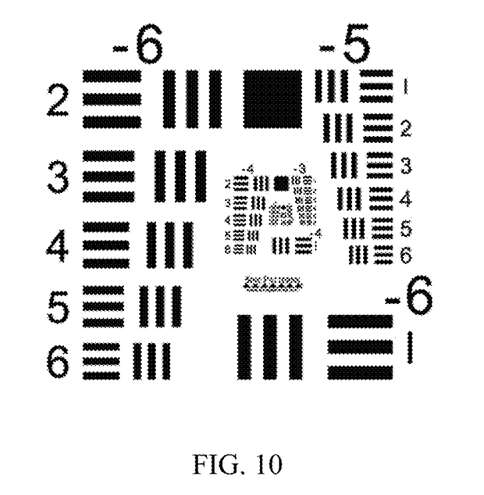
FIG. 10 illustrates the original chart provided for the exemplary microlens array imaging device shown in FIG. 1.

FIG. 10 shows an original chart used as an object for the microlens array imaging device; and FIGS. 11-14 illustrate schematic views of imaging and combining the projected image of the original chart shown in FIG. 10 by the microlens array imaging device.

Figure 11:
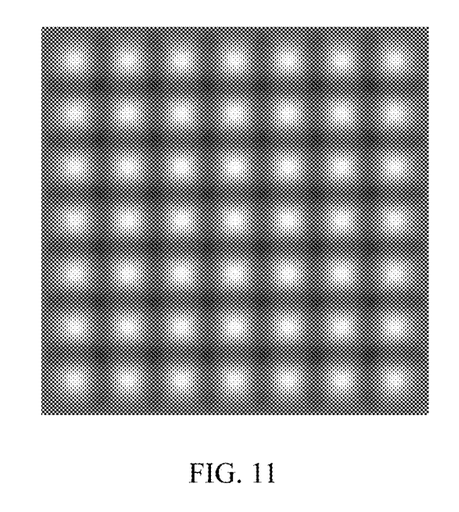
FIGS. 11-14 illustrate schematic views of imaging and combining the projected image of the original chart shown in FIG. 10 by the exemplary microlens array imaging device shown in FIG. 1.
Figure 12:
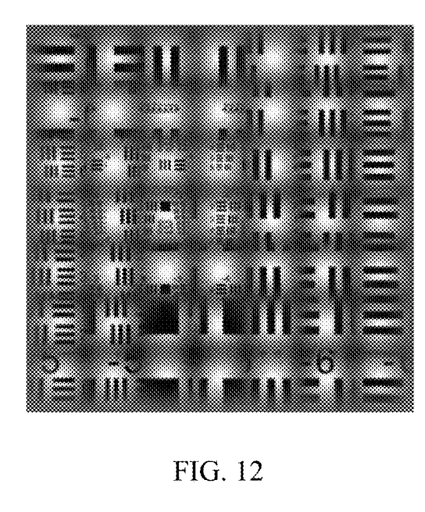
Figure 13:
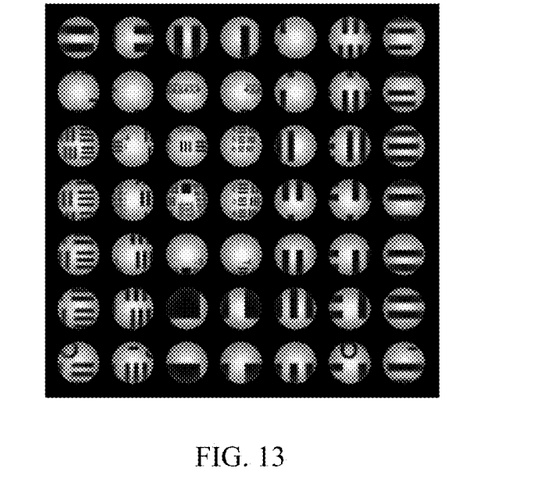
Figure 14:
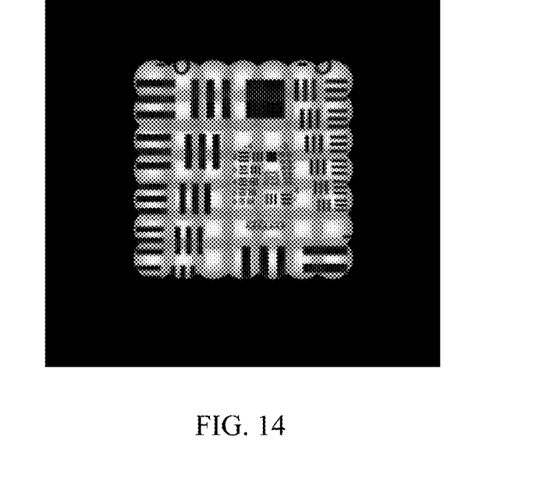

Referring to FIG. 11, the second images of each microlens are arranged in an array. As shown in FIG. 12, when the original chart is projected on the image acquisition unit 150 by the microlens array 130, the image circles 181 of the second images of each microlens are clearly separated and at the same time the circles of confusion 182 of the second images of each microlens overlap causing interference and aliasing. The image processing unit 160 removes the distorted circles of confusion 182 of the second images and transforms the second images into an array of images circles that are clear and separated by a distance, as shown in FIG. 13. Further, the image processing unit 160 combines the separated images 181 to form a clear image of the original chart, as shown in FIG. 14.

The microlens array imaging device may be able to eliminate the interference and aliasing of the second images projected on the image acquisition unit 150 by adjacent microlenses 131 and may effectively utilize the pixel units of the image acquisition units 150. When the image processing unit 160 moves and combines together the second images, the image circle 181 of the second image of each microlens 131 is tangent to the image circle 181 of the second image of the diagonal microlens 131. Consequently, the combined image may have a maximum image resolution.

Thus, the microlens array imaging device may be able to eliminate the interference and aliasing of the second images projected on the image acquisition unit 150 by adjacent microlenses 131 and may effectively utilize the pixel units of the image acquisition unit 150. Because the first image 121 is located on the side of the image acquisition unit 150 away from the microlens array 130, the first image 121 may be the virtual object of the microlens array 130. In other words, the microlens array imaging device may use the virtual object imaging method of the microlens array 130 to reduce the thickness of the microlens array imaging device.

Figure 15:
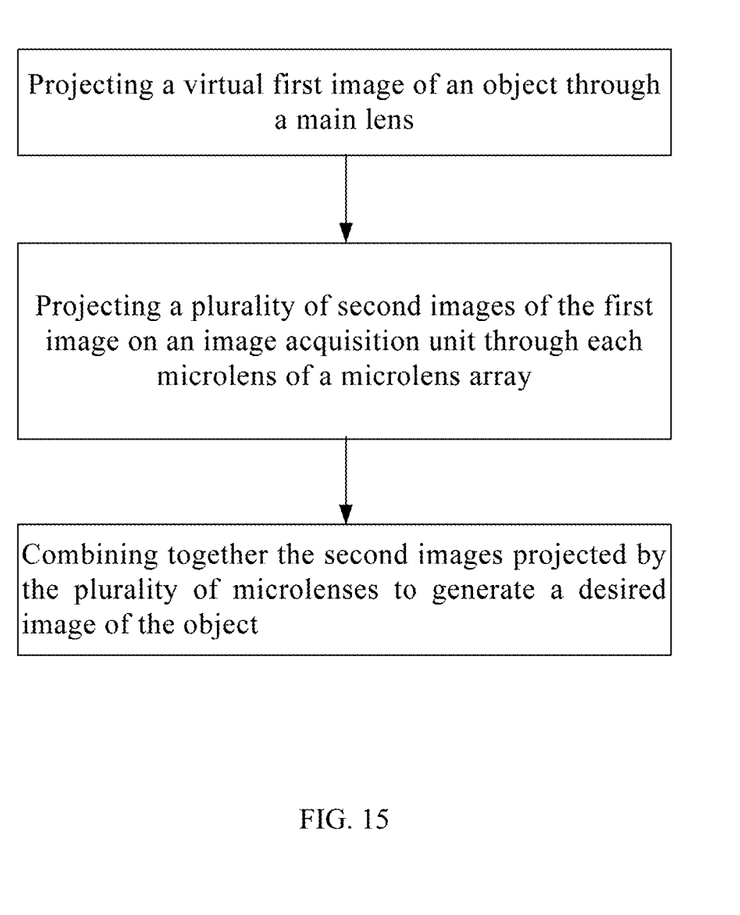
FIG. 15 illustrates a flow chart of an exemplary imaging method of microlens array according to the disclosed embodiments.

Referring to FIG. 15, the present disclosure provides an imaging method of microlens array. The imaging method may include the following steps.

Step 21: projecting a first image of an object through a main lens.

For example, the microlens array imaging device may project a first image of the target object through the main lens. Because the first image is located on the side of the image acquisition unit away from the microlens array, the first image may be a virtual image.

Step 22: projecting a plurality of second images of the first image on the image acquisition unit through each microlens of the microlens array.

In this step, the first image is the virtual object for the microlens array. Each second image may include an image circle and a circle of confusion around the image circle. The distance between the centers of the image circles of adjacent microlenses may be equal to or greater than the summation of the radius of the second image corresponding to one microlens and the radius of the image circle corresponding to the adjacent microlens, and may be equal to or less than the summation of the radius of the second image corresponding to one microlens and the radius of the second image corresponding to the adjacent microlens.

Step 23: combining together the second images projected by the plurality of the microlenses to form an image of the target object.

The microlens array imaging device may move and combine together the second images projected by the plurality of the microlenses. The image circle of the second image of each microlens may partially overlap with the image circle of the second image of the adjacent microlens. The image circle of the second image of each microlens may be tangent to the image circle of the second image of the diagonal microlens.

The imaging method of the microlens array may be able to eliminate the interference and aliasing of the second images projected on the image acquisition unit by adjacent microlenses and may effectively utilize the pixel units of the image acquisition unit. Because the first image is the virtual object for the microlens array, the virtual object imaging method of the microlens array may further reduce the thickness of the microlens array imaging device.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A microlens array imaging device, comprising:
a main lens;

a microlens array containing a plurality of microlenses arranged in an array; and an image acquisition unit configured to acquire images projected by the microlens, wherein, the main lens projects a first image of an object for the plurality of microlenses, each of which projects a second image of the first image on the image acquisition unit;

each second image includes an image circle and a circle of confusion around the image circle; and a distance between an image circle of one microlens and an image circle of an adjacent microlens is equal to or greater than a summation of a radius of the second image corresponding to the one microlens and a radius of the image circle of the adjacent microlens, and is equal to or less than a summation of the radius of the second image corresponding to the one microlens and a radius of the second image corresponding to the adjacent microlens.

2. The microlens array imaging device of claim 1, wherein:

the image acquisition unit is disposed a side of the microlens array away from the main lens; and the first image of the object is projected on a side of the image acquisition unit away from the microlens array.

3. The microlens array imaging device of claim 1, wherein a circle of confusion of the one microlens is tangent to a circle of confusion of the adjacent microlens.

4. The microlens array imaging device of claim 1, wherein the microlens array imaging device has an actual aperture stop same as an aperture stop of the main lens.

5. The microlens array imaging device of claim 1, wherein the image circle of each second image is an image of principal rays that are projected on the image acquisition unit.

6. The microlens array imaging device of claim 1, wherein the plurality of the microlenses has same dimensions and shapes.

7. The microlens array imaging device of claim 6, wherein the image circle of the one microlens is tangent to the circle of confusion of the adjacent microlens.

8. The microlens array imaging device of claim 1, further including an image processing unit configured to combine together the second images of the plurality of microlenses to generate a desired image of the object.

9. The microlens array imaging device of claim 8, wherein the ratio of overlapping of the second image of the one microlens to the second image of the adjacent microlens is proportional to a diameter of the image circle of the second image of each of the one microlens and the adjacent microlens.

10. The microlens array imaging device of claim 8, wherein the image circle of the second image of the one microlens is tangent to an image circle of the second image of diagonal microlens.

11. An imaging method for a microlens array imaging device containing a main lens, a microlens array containing a plurality of microlenses arranged in an array, and an image acquisition unit configured to acquire images projected by the microlens, the method comprising:

projecting a first image of an object through the main lens for the plurality of microlenses; and projecting a plurality of second images of the first image on the image acquisition unit through each microlens, wherein:

each second image includes an image circle and a circle of confusion around the image circle; and a distance between an image circle of one microlens and an image circle of an adjacent microlens is equal to or greater than a summation of a radius of the second image corresponding to the one microlens and a radius of the image circle of the adjacent microlens, and is equal to or less than a summation of the radius of the second image corresponding to the one microlens and a radius of the second image corresponding to the adjacent microlens.

12. The imaging method of claim 11, wherein the first image is a virtual object for the microlens array.

13. The imaging method of claim 11, wherein a circle of confusion of the one microlens is tangent to a circle of confusion of the adjacent microlens.

14. The imaging method of claim 11, further including combining together the second images projected by the plurality of the microlenses to generate a desired image of the object.

15. The imaging method of claim 14, wherein the image circle of the second image of the one microlens is tangent to an image circle of the second image of a diagonal microlens.

* * * * *